United States Statutory Invention Registration [19]

[11] Reg. Number: H661

Dueber

[43] Published: Aug. 1, 1989

[54] CATHODE CONTAINER FOR SODIUM-SULFUR CELLS

[75] Inventor: Ross E. Dueber, Kettering, Ohio

[73] Assignee: The United States of America as represented by the Secretary of the Air Force, Washington, D.C.

[21] Appl. No.: 29,561

[22] Filed: Mar. 24, 1987

[51] Int. Cl.[4] ..... H01M 4/36

[52] U.S. Cl. ..... 429/104; 429/175; 206/333

[58] Field of Search ..... 429/104

[56] References Cited

U.S. PATENT DOCUMENTS

| | | | |
|---|---|---|---|
| 3,404,035 | 10/1968 | Kummet et al. | 429/104 |
| 4,035,553 | 7/1977 | Evans et al. | 429/104 |
| 4,110,516 | 8/1978 | Breiter | 429/104 |
| 4,209,573 | 6/1980 | Chatterji et al. | 429/104 |
| 4,219,128 | 8/1980 | Breiter et al. | 429/104 |
| 4,230,780 | 10/1980 | Jacquelin | 429/104 |
| 4,234,668 | 11/1980 | Park et al. | 429/104 |
| 4,246,325 | 1/1981 | Hatch | 429/50 |
| 4,341,849 | 7/1982 | Park et al. | 429/104 |
| 4,460,662 | 7/1984 | Damrow et al. | 429/104 |
| 4,576,881 | 3/1986 | Hasenauer et al. | 429/104 |

*Primary Examiner*—Edward A. Miller

*Attorney, Agent, or Firm*—Bobby D. Scearce; Donald J. Singer

[57] ABSTRACT

A corrosion resistant structure for a sodium-sulfur cell is described which comprises a container structure for the sulfur cathode including an outer metallic container having an inner surface defining a volume for containing the cathode, a layer of glass on the inner surface of the container, and a current collector of metallic foil disposed within the container adjacent the glass layer for containing the cathode. A preferred embodiment includes stainless steel as the container material and molybdenum foil as the current collector material.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CATHODE CONTAINER FOR SODIUM-SULFUR CELLS

The invention described herein may be manufactured and used by or for the Government of the United States for all governmental purposes without the payment of any royalty.

BACKGROUND OF THE INVENTION

The present invention relates generally to rechargeable cells containing liquid sodium and sulfur and more particularly to a corrosion resistant cathode container and current collector structure for sodium-sulfur cells.

In the operation of a sodium-sulfur cell, both the sodium and sulfur are liquid at the operating temperature of the cell. Sodium ions from the liquid sodium anode are transported through a ceramic electrolyte to the liquid sulfur cathode and react with sulfur to form sodium polysulfides according to the reversible reaction, $$2Na + xS \rightleftarrows Na_2S_x \ (x=3, 4, \text{or } 5).$$

The sodium ions surrender charge in the reaction, and the current generated thereby is conducted through the sulfur and supporting wick material to a metallic container which is connected to a terminal. The metallic container is typically stainless steel with a chromium coating on the inner surface thereof to impede corrosion of the container by sodium polysulfides formed during cell operation. The chromium coating eventually corrodes by reaction with polysulfides to form $NaCrS_2$ which seriously impairs performance of the cell, particularly through deterioration of the electrolyte.

The invention solves or substantially reduces in critical importance the foregoing problem with existing sodium-sulfur cell structures by providing a reliable corrosion resistant container and current collector structure for the liquid sulfur cathode. The invention comprises a metallic outer container for the cathode having on the inner surface thereof a coating of electrically insulating, nonreactive glass. Adjacent the glass coating is a tubular metallic cathode current collector.

It is therefore a principal object of the invention to provide an improved liquid sodium-sulfur cell structure.

It is another object of the invention to provide a corrosion resistant cathode container structure for sodium-sulfur cells.

These and other objects of the invention will become apparent as the detailed description of representative embodiments proceeds.

SUMMARY OF THE INVENTION

In accordance with the foregoing principles and objects of the invention, a corrosion resistant structure for a sodium-sulfur cell is described which comprises a container structure for the sulfur cathode including an outer metallic container having an inner surface defining a volume for containing the cathode, a layer of glass on the inner surface of the container, and a current collector of metallic foil disposed within the container adjacent the glass layer for containing the cathode. A preferred embodiment includes stainless steel as the container material and molybdenum foil as the current collector material.

DESCRIPTION OF THE DRAWINGS

The invention will be clearly understood from the following detailed description of representative embodiments thereof read in conjunction with the accompanying drawing wherein.

DETAILED DESCRIPTION

Figure 1:
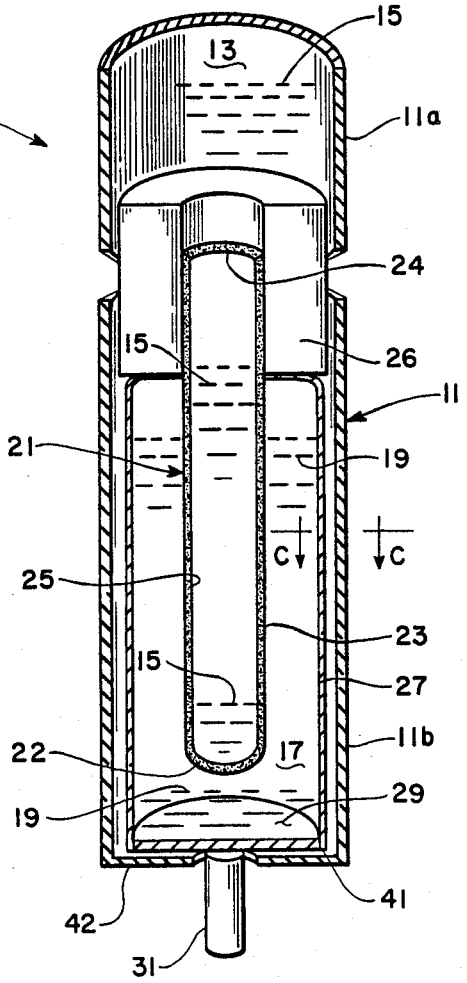
FIG. 1 is a view in axial section of a liquid sodium-sulfur cell structure of the invention.

Referring now to the drawings, FIG. 1 shows a view in axial section of a representative sodium-sulfur cell 10 of the invention. Hermetically sealed metallic container 11 of generally tubular shape defines within a first container portion 11*a* first chamber 13 for containing sodium 15 (m.p. about 97.8° C.) comprising the anode of cell 10, and in a second container portion 11*b*, a second chamber 17 for containing sulfur 19 (m.p. about 112.8° C.) comprising the cathode of cell 10. Sodium 15 and sulfur 19 are liquid at normal operating temperatures for cell 10 (about 300°–350° C.). Container 11 may comprise substantially any metal or alloy known in the art for sodium-sulfur cell structure. In accordance with the teachings below in relation to FIG. 3, the inner surface of container 11 receives a glass coating and, therefore, container 11 may comprise any suitable metallic material such as aluminum, stainless steel, cold rolled steel or ceramic, although E-Brite TM stainless steel in thickness of about 0.012 to 0.030 inch may be preferred.

An electrolyte 21 comprising solid ceramic material in generally tubular shape separates chamber 13 containing sodium 15 from chamber 17 containing sulfur 19. Electrolyte 21 may comprise any ceramic material normally included in conventional cells for conducting sodium ions through the thickness (usually about 0.030 to 0.120 inch) thereof in cell operation including beta alumina, beta alumina, Nasicon (acronym for sodium superionic conductor containing sodium, zirconium, silicon, phosphorus and oxygen) or haloborate glasses. One closed end 22 of electrolyte 21 extends into chamber 17 whereby liquid sulfur 17 contacts and wets outer surface 23 of electrolyte 21 along a substantial portion of the length thereof, and an open end 24 communicates with chamber 13 allowing liquid sodium 15 to fill the inner volume defined by electrolyte 21 for contacting and wetting inner surface 25 thereof. Suitable conventional wicking materials (not shown) may be included within chambers 13,17 for facilitating flow by capillary action of liquid sodium 15 and liquid sulfur 19 in wetting respective inner and outer surfaces 23,25 of electrolyte 21; typical wicking materials for liquid sodium 13 may include wire mesh of stainless steel, copper, nickel or molybdenum, and for liquid sulfur 19 may include graphite fiber fabric, felt or mat. Open end 24 of electrolyte 21 is sealed within annular insulating block 26 of alpha alumina or other suitable ceramic insulator conventional to sodium-sulfur cell structures. Metallic foil layer 27 (0.001 to 0.020 inch thick) of molybdenum, gold or other suitable metal or alloy defines chamber 17 and separates sulfur 19 contained therein from contacting container 11 to prevent corrosion by sodium polysulfides formed in operation of cell 10. Layer 27 further comprises an electric current collector in the operation of cell 10 and is connected to or integral with metallic (e.g., like material to layer 27) collector plate 29 and terminal 31 on second container portion 11*b* as suggested in FIG. 1. First container portion 11*a* containing liquid sodium 15 is electrically insulated from second container portion 11*b* as at insulating block 26, and may comprise a second electrical contact for cell 10.

Figure 2:
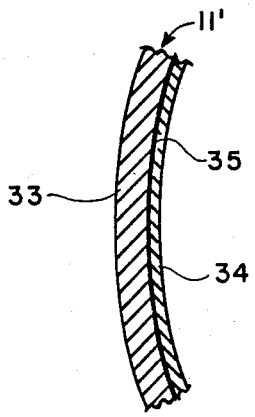
Fig. 2 PRIOR ART
FIG. 2 is a fragmentary sectional view of a prior art container structure.

Referring now to FIG. 2, shown therein is a cross-sectional view of a conventional container 11' structure for sodium-sulfur cells. Container 11' conventionally includes a first metallic outer layer 33. Layer 33 is etched or otherwise treated and plated with layer 34 of chromium for corrosion resistance; adherence or compatibility layer 35 comprisIng zinc, copper or other suitable metal may be applied to layer 33 prior to plating layer 34.

Figure 3:
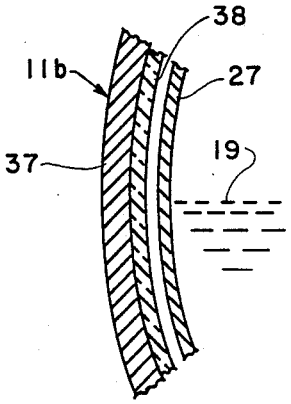
FIG. 3 is a view along line C—C of FIG. 1.

Referring now to FIG. 3, shown therein is an enlarged cross sectional view along line C—C of FIG. 1. In accordance with the teachings of the invention, current collector portion 11*b* containing the sulfur 19 cathode includes an outer layer 37 of metal or alloy, including the group listed above suitable for being plated with layer 38 of glass. Glass layer 38 is selected to provide an electrically insulating, chemically nonreactive and corrosion resistant coating to container 11 and may comprise a Pyrex TM or other suitable composition glasses. Functionally satisfactory glass layers 38 may be applied to a thickness of about 0.0005 to 0.005 inch by conventional deposition techniques known in the applicable art field. A preferred glass material is S5210-2C (Solar Turbine Corp), a commercially available glass having excellent stability against chemical attack and coefficient of thermal expansion compatible with preferred layer 37 materials. Layer 38 of S5210-2C to about 0.002 inch thickness provides substantial resistance to chemical attack and eliminates need for a chromium or other additional metallic layer (34 in FIG. 2) included in conventional cell structures. With reference again to FIG. 1, glass layer 38 as shown in FIG. 3 covers the entirety of the inner surface of container portion 11*b* defining chamber 17, and is preferably included on insulating block 26 and regions of contact between block 26 and container portion 11*b* to avoid corrosion of any metallic seals included in structures joining container portions 11*a*, 11*b* or electrolyte 21 to block 26.

Glass layer 38 is electrically nonconductive, and therefore, metallic layer 27 is included partly to provide a shunt for conducting current to collector plate 29 and/or terminal 31. Molybdenum is a preferred material for layer 27 since it is highly resistant to corrosives generated during operation of cell 10 and can be fabricated as foil. In the fabrication of cell 10 in accordance with the teachings of the invention, foil layer 27 may be formed into tube shape corresponding in size to the inner dimensions of container 11 and welded (e.g. by electron beam welding) to collector plate 29 as at weld joint 41. Closure disk 42 of like material to layer 37 may be welded to an open end of container portion 11*b* for closure of cell 10. The outer surface of collector plate 29 and inner surface of disk 42 may be plated with a glass layer similar to that applied to container portion 11*b*, with terminal 31 electrically connected through plate 29 to foil layer 27. Glass layer 38 defining the inner surface of container portion 11*b* may be melded with the glass layer on disk 42 by heating that end of container portion 11*b*.

The invention therefore teaches a corrosion resistant structure for sodium-sulfur cells. It is understood that modifications to the inventon may be made as might occur to one with skill in the field of the invention within the scope of the appended claims. All embodiments contemplated hereunder which achieve the objects of the invention were therefore not shown in complete detail. Other embodiments may be developed without departing from the spirit of the invention or from the scope of the appended claims.

I claim:

1. A container structure for the cathode of a sodium-sulfur electric cell comprising:

(a) a metallic first container having an inner surface defining a substantially closed chamber for containing sulfur comprising the cathode of said cell;

(b) a thin continuous layer of glass on said inner surface of said metallic first container; and (c) a substantially closed metallic foil second container disposed within said metallic first container for containing said sulfur comprising said cathode of said cell and for collecting current from said cathode.

2. The structure of claim 1 wherein said metallic first container comprises a material selected from the group consisting of stainless steel, aluminum, and cold rolled steel.

3. The structure of claim 1 wherein said thin continuous layer of glass has thickness of from about 0.0005 to about 0.005 inch.

4. The structure of claim 1 wherein said mettalic foil second container comprises a material selected from the group consisting of molybdenum and gold.

5. The structure of claim 4 wherein said metallic foil second container has wall thickness of from about 0.001 to about 0.020 inch.

6. In a hermetically sealed sodium-sulfur electric cell including a solid ceramic electrolyte separating a first chamber containing a sodium anode from a second chamber containing a sulfur cathode, an improvement comprising a corrosion resistant container structure for said cathode including:

(a) a metallic first layer having an inner surface defining and substantially enclosing the second chamber;

(b) a thin continuous layer of glass on said inner surface of said metallic first layer; and (c) a substantially closed metallic foil second layer disposed within said metallic first layer and enclosing the cathode for collecting current from said cathode.

7. The cell of claim 6 wherein said metallic first layer comprises a material selected from the group consisting of stainless steel, aluminum, and cold rolled steel.

8. The cell of claim 6 wherein said thin continuous layer of glass has thickness of from about 0.0005 to about 0.005 inch.

9. The cell of claim 6 wherein said metallic foil second layer comprises a material selected from the group consisting of molybdenum and gold.

10. The cell of claim 9 wherein said metallic foil second layer has thickness of from about 0.001 to about 0.020 inch.

* * * * *